United States Patent [19]

Stone

[11] Patent Number: 4,950,695

[45] Date of Patent: Aug. 21, 1990

[54] REDUCTION OF FIRMNESS IN FLEXIBLE POLYURETHANE FOAM BY ADDITION OF MONOFUNCTIONAL ALCOHOLS, POLYESTERS, AND POLYETHERS

[75] Inventor: Herman Stone, Hazleton, Pa.

[73] Assignee: PMC, Inc., Sun Valley, Calif.

[21] Appl. No.: 321,530

[22] Filed: Mar. 6, 1989

[51] Int. Cl.$^5$ ............................................ C08G 18/14
[52] U.S. Cl. .................................... 521/157; 521/170; 521/173; 521/174; 521/176; 528/49
[58] Field of Search ............... 521/157, 170, 173, 174, 521/176; 528/49

[56] References Cited

U.S. PATENT DOCUMENTS 3,875,086  4/1975  Remey et al. .......................... 528/49
4,376,832  3/1983  Speranza et al. ...................... 528/49

*Primary Examiner*—Maurice J. Welsh
*Attorney, Agent, or Firm*—Davis Hoxie Faithfull & Hapgood

[57] ABSTRACT

Improved, flexible, open-celled polyurethane foams of reduced firmness, but with densities comparable to those of standard foams, are described. The foams are formed in situ from the reaction of isocyanate, one or more blowing agents including water, a foam stabilizer, polyether polyols or polyester polyols or a mixture of these polyols, and monofunctional materials chemically analogous to the polyols, in the presence of a catalyst. The monofunctional materials can be alcohols, polyesters, or polyethers. Useful monofunctional alcohols have carbon chain lengths of at least 3, and preferably from 8 to 20. Useful monofunctional polyesters have molecular weights from 300 to 2000, and preferably from 300 to 800. Useful monofunctional polyethers, which are derived from the reaction of a monofunctional alcohol with propylene oxide and/or ethylene oxide, have molecular weights from 100 to 3000, and preferably from 200 to 1800.

26 Claims, No Drawings

REDUCTION OF FIRMNESS IN FLEXIBLE POLYURETHANE FOAM BY ADDITION OF MONOFUNCTIONAL ALCOHOLS, POLYESTERS, AND POLYETHERS

FIELD OF THE INVENTION

This invention relates to flexible, open-celled, free-rise polyurethane ("PU") foams made by molding or by continuous casting methods. When formulated in accordance with the present invention, PU foams of reduced firmness can be manufactured, without significant effects on density. Such soft foams are particularly suitable for use in furniture, e.g., as backings in chairs and sofas.

BACKGROUND INFORMATION

Flexible PU foams are produced from formulations typically containing an isocyanate reactant, one or more blowing agents including water, a foam stabilizer, catalysts, and polyether polyols or polyester polyols or a mixture of these polyols.

Those skilled in the art have known for some time that the density of a foam can be controlled by carefully regulating the proportion of water in the formulation. However, the reaction of water with isocyanate compounds yields not only $CO_2$ gas (which causes expansion of the foam), but also a urea-type product which increases the firmness of the foam. The use of water as a blowing agent thus does not permit the variation of firmness independently of density. Also, the water-/isocyanate reaction generates a significant amount of heat. Thus, the maximum amount of water which can be used is limited by safety considerations and by the foam properties desired.

For years this problem has been circumvented by including in the formulations certain low-boiling, non-reactive liquids, e.g., methylene chloride or chlorofluorocarbons. Such auxiliary blowing agents permit the lowering of density without an increase in firmness, resulting in soft, stable, resilient foams. However, the use of these agents is now seen as undesirable, due to concern about the health effects of exposure to methylene chloride vapors and to concern about adverse environmental effects, specifically, depletion of the atmospheric ozone layer which may result from the release of chlorofluorocarbons into the atmosphere.

Consistent with well-established principles of polymer chemistry, the firmness of a foam (or of any other polymer) can be reduced during production by decreasing the average "crosslink density." For example, softer PU foams are obtained by increasing the average molecular weight of the polyether triols or polyester triols typically used in foam formulations, thereby reducing the number of reactive sites. Similarly, in formulations containing crude TDI (tolylene diisocyanate) or polymeric MDI (methylene diparaphenylene isocyanate), the functionality of the isocyanate compound can be decreased to achieve some softening. In formulations which instead contain distilled TDI, softness can be somewhat enhanced by limiting the excess amount of TDI present (i.e., by lowering the TDI index) or by increasing the ratio of 2,4-isomer to 2,6-isomer.

All of the above techniques are well-known in the art. All, however, are limited in the degree of softness which can be attained without adversely affecting density and other physical properties, or without creating manufacturing problems.

Another method for decreasing average crosslink density is the blending of polyether diols with the polyether triols generally used in foam formulations. As with the techniques already discussed, this offers only a limited degree of softening. Also, this blending method requires a manufacturing process which is capable of making extensive changes in the delivery rates of two polyols each time a foam having a different grade of firmness is to be produced. Since it is common industrial practice to switch from production of one foam grade to another "on the fly," i.e., without interrupting the flow of materials to the mixing head, this blending technique is commercially unattractive.

SUMMARY OF THE INVENTION

In the manufacture of thermoplastic (i.e., linear) polymers, it is generally known that molecular weight can be controlled by adding certain monofunctional compounds to the polymer formulation. These "chain stoppers" react with the ends of the growing linear molecule, preventing further growth of the thermoplastic polymer. Such monofunctional additives are effective even in small amounts.

The present invention expands this principle from linear applications into the realm of three-dimensional, thermoset polymers. Specifically, it has now been discovered that the average crosslink density of a growing thermoset polymer can be decreased by adding small amounts of monofunctional ingredients chemically analogous to the polyfunctional ingredients already in the formulation. An example of this method is the addition of a monoisocyanate to the diisocyanate commonly used in PU foam formulations. However, because monoisocyanates are not readily available and also are highly volatile and toxic, this approach is not preferred.

A preferred approach is the addition of monofunctional materials analogous to the polyether polyols or polyester polyols in the foam formulation. These monofunctional materials, which may be alcohols, polyesters, or polyethers, are added in an amount of about 1 to about 50 parts by weight per 100 parts by weight of polyol. Preferably, monofunctional polyethers and polyesters are added in an amount of about 5 to about 25 parts by weight per 100 parts by weight of polyol. Preferably, monofunctional alcohols are added in an amount of about 2 to about 10 parts by weight per 100 parts by weight of polyol. The greater the proportion of monofunctional additive, the softer the resulting foam.

Employing controlled addition of small amounts of these monofunctional analogs to foam formulations, the present invention permits variation of firmness at any given density. The density is in turn controlled by other formulation parameters not addressed in this specification.

A further benefit arising from use of the additives of the present invention is the production of a foam with a more open cell structure, i.e., a foam having a relatively higher air permeablility rating than that of a conventional foam of equivalent firmness.

DETAILED DESCRIPTION OF THE INVENTION

The invention relates to soft PU foams and to a method for making such foams. The term "soft," as used in this specification, means a foam exhibiting a relatively lower Compression Force Deflection (CFD) or Indentation Force Deflection (IFD) rating as compared with a standard foam not employing the method of this invention.

The desired softening is achieved by changing the chemical structure of the foam -- without either introducing auxiliary blowing agents or using chemical reactions different from those used to make standard firm foams. The chemical structure is changed by adding to the foam formulation monofunctional alcohols, polyethers, or polyesters analogous to the polyether polyols or polyester polyols already in the formulation. The monofunctional ingredients are added in an amount of about 1 to about 50 parts by weight per 100 parts by weight of polyol. Preferably, monofunctional polyethers and polyesters are added in an amount of about 5 to about 25 parts by weight per 100 parts by weight of polyol. Preferably, monofunctional alcohols are added in an amount of about 2 to about 10 parts by weight per 100 parts by weight of polyol.

Because no major differences in the chemical reaction are introduced, the properties and performance of the foams are not adversely affected. As with standard firm foams, the soft foams of the present invention demonstrate satisfactory maintenance of properties upon aging or use: e.g., compression set, rate of yellowing on exposure to light, and hydrolytic stability.

The conventional polyester polyol reactants useful in the invention are those known to those skilled in the art to be suitable in the production of PU foams. The conventional polyester polyol reactant normally has an average molecular weight of about 800 to 3000, with the hydroxyl number of the polyester polyol being in the range of about 35 to about 150. Generally preferred are polyester polyol reactants of about 1700–2500 average molecular weight, having an average hydroxyl functionality of between about 2 and 3. The polyester polyol reactants useful in the invention can be obtained, for example, by the esterification of polycarboxylic acids with polyhydric alcohols. If desired, the acid halides or anhydrides of the polycarboxylic acids can be reacted with the alcohols. Most preferred are the conventional commercial products made from adipic acid, diethylene glycol and a small percentage of glycerine.

The polyether polyol reactants useful in the invention are also conventional in the art. The polyether polyol normally has a molecular weight of about 2000 to about 6500 and preferably from about 2700 to about 3900, with a hydroxyl functionality of about 2 to about 8, preferably about 2 to about 3. Suitable polyether polyols can be prepared by the addition of an excess of alkylene oxides, such as propylene oxide ("PO") and/or ethylene oxide ("EO"), to glycerine, trimethylolpropane, pentaerythritol, alphamethylglucoside, sorbitol or sucrose, for example. Most preferred are polyether polyols of glycerine, PO and EO, and those modified by copolymerizing with styrene or mixtures of styrene and acrylonitrile. The latter are commonly referred to as "polymer polyols" or "graft polyols."

The monofunctional additives useful in the invention are alcohols, polyesters, or polyethers, the latter being made by the addition reaction of PO and/or EO with a monofunctional alcohol which serves as an initiator.

The useful monofunctional alcohols of the invention contain at least 3 carbon atoms, preferably from 8 to 20. A preferred alcohol is cetyl alcohol, which contains 16 carbon atoms and which is commercially available from, e.g., Ethyl Corp. and Vista Chemicals.

The useful monofunctional polyesters of the invention range in molecular weight from about 300 to about 2000, preferably from about 300 to about 800. One such monofunctional polyester may be prepared by the following conventional reaction steps:

1. One mole of acetylchloride is reacted with one mole of diethylene glycol ("DEG"). After neutralization and water washing, the intermediate product $CH_3COOCH_2CH_2OCH_2CH_2OH$ ("[A]") is isolated by distillation.

2. [A] is reacted with one mole of succinic anhydride to produce $CH_3COOCH_2CH_2OCH_2CH_2OCOCH_2CH_2COOH$ ("[B]").

3. [B] is reacted with DEG to produce $CH_3COOCH_2CH_2OCH_2CH_2OCOCH_2CH_2COOCH_2CH_2OCH_2CH_2OH$ ("[C]"). [C] is then purified by water washing (to remove unreacted DEG) and by vacuum distillation (to remove disubstituted product).

4. Steps 2 and 3 are repeated, each time increasing the molecular weight of the final product by about 180 units.

The useful monofunctional polyethers of the invention range in molecular weight from about 100 to about 3000, preferably from about 200 to about 1800. In particular, a 1700-molecular-weight polyether, made from a 50/50 blend of EO and PO, and a 550-molecular-weight polyether, made from EO, have been found suitable. Both are intermediates, obtained from Dow Chemical Company, and are identified by Dow as XF-13507 and AE-501, respectively. Other alkylene oxides, or blends of alkylene oxides, are useful and can be prepared using methods well-known in the art.

The monofunctional additives of the invention can be saturated compounds or can contain other structural features which do not react with isocyanate. Such features might include, e.g., unsaturation, aromatic rings, and halogens. As illustrated in Table 1, the lower the molecular weight and the higher the hydroxyl number of the monofunctional additive, the more efficient it will be at decreasing average crosslink density of the foam product. However, for practical reasons (e.g., to decrease the danger of flammability and to increase control in metering), preferred materials have a molecular weight of at least 100.

The isocyanate reactant used in the invention is also conventional in the art of PU foam production. Preferably, TDI is employed and, as used, is one of the commercially available mixtures of the 2,4- and 2,6-isomers, ranging from about 65 to about 80% of the 2,4-isomer, and preferably about 80%. However, other polyisocyanates having on average 2 isocyanate groups per aromatic ring are suitable. Examples of such compounds are phenylene diisocyanate, naphthalene diisocyanate, diphenyl-4,4'-diisocyanate, xylene diisocyanate, and the like. The amount of polyisocyanate normally added (i.e., the polyisocyanate "index") is about 102% to about 110% of the amount required to react stoichiometrically with the reactive groups in the formulation, which reactive groups comprise primarily the hydroxyl groups of the polyols and the water.

Conventional blowing agents and catalysts are also used in the present invention. Water is the preferred blowing agent, but can be supplemented by volatile organic blowing agents. Water can be present in an amount from about 2 to about 6 parts by weight per 100 parts by weight of total polyol present. Preferably, water is present in amounts of about 3 to about 5 parts per 100 parts of polyol.

Salts of organic acids or organometallic compounds are usually used to catalyze the reaction. Organic tin compounds are normally used; useful catalysts include salts of carboxylic acids such as tin (II) acetate, tin (II) octoate, tin (II) ethylhexoate, tin (II) laurate and dialkyl tin salts such as dibutyl tin diacetate, dibutyl tin dilaurate, dibutyl tin maleate and dioctyl tin diacetate. The organic metal catalyst is normally added in amounts of from about 0.1 to about 1.0 parts by weight per 100 parts by weight of total polyol present. Preferably it is present in amounts of about 0.1 to about 0.6 parts. The preferred catalyst is stannous octoate.

Tertiary aliphatic amines are also conventional and are used as co-catalysts in the production of the PU foams of the invention. Useful compounds include, for example, triethylenediamine, N-ethylmorpholine, N,N,N',N'-tetramethyl-1,3-butanediamine, bis 2-(N,N-dimethylamino) ethyl ether, diethylenetriamine, oxybis (N,N,-diethanolamine) and other compounds well-known to the art. Such compounds normally are added in amounts of from about 0.1 to about 0.6 parts by weight per 100 parts by weight of total polyol present. Preferably, they are present in amounts of about 0.2 to 0.4 parts. Preferred are mixtures of diethylenetriamine and oxybis (N,N'-diethanolamine).

Conventional PU foam stabilizers can also be and usually are included in the reaction mixture of the present invention. Useful stabilizers include those well known to the art, e.g., organo-silicone ethers. A preferred polyether silicone, designated Surfactant L-532, is commercially available from Union Carbide Corporation. Normally, such stabilizers are added in amounts of from about 0.7 to about 6 parts by weight per 100 parts by weight of total polyol present. Preferably, they are present in amounts of from about 1 to about 2 parts.

Other optional ingredients which can be added to the formulations of the invention include discoloration and aging inhibitors, flame retardants, pigments, such as carbon black, colorants, and the like.

Production of the PU foams of the invention can be achieved by use of conventional foam-making machinery operated in a manner known to those skilled in the art. The foams can be made either by molding or by casting processes. In the latter, reactants and additives are mixed together and deposited on a moving casting conveyor in a conventional manner where the foam rises and reaches a self-sustaining configuration, after which it can be cut and otherwise handled.

Tables 2 through 5 further illustrate the invention, but are not inclusive of the full scope of the invention. Ingredients and entries in those tables are here described:

Polyols

Voranol 3140 - a polyether polyol having a hydroxyl number of 44. It is sold by Dow Chemical Company.

Niax 16-46 - a polyether polyol having a molecular weight of about 3500. It is sold by Union Carbide Corp.

Fomrez F-53 - a polyester polyol sold by Witco Chemical Corporation.

Stabilizers

Q25160 - a polysiloxane, sold by Dow Corning.

Silicone Surfactant L-532 - An organic polysiloxane sold by Union Carbide Corp.

Co-catalysts

Niax A-1 - bis (2-dimethylamino ethyl) ether (70%) in propylene glycol (30%). It is sold by Union Carbide Corp.

Dabco 33LV - triethylenediamine (33%) in propylene glycol (67%). It is sold by Air Products and Chemicals, Inc.

NEM - N-ethylmorpholine, sold by, e.g., Air Products and Chemicals, Inc. and Texaco.

Niax A-30 - a blend of tertiary aliphatic amines, sold by Union Carbide Corp.

Catalysts

C-4 - a tin catalyst comprising stannous octoate diluted with an equal amount of di(2-ethylhexyl) phthalate plasticizer. It is sold by Witco Chemical Corporation.

T-10 - a tin catalyst similar to C-4. It is sold by Air Products and Chemicals, Inc.

S-10 - a tin catalyst comprising 100% stannous octoate.

Additives

EPAL 6 - hexanol, sold by Ethyl Corp.

EPAL 12/70 - a blend of n-dodecanol (70%) and n-tetradecanol (30%). It is sold by Ethyl Corp.

EPAL 1218B - a blend of C12, C14, C16, and C18 linear alcohols, with an average molecular weight of 214. It is sold by Ethyl Corp.

DIDP - diisodecyl phthalate, used as an inert plasticizer. It is sold by, e.g., BASF Corp. DIDP is not among the useful additives of this invention, and is included in Tables 3 and 5 merely as a control.

Polyglycol XF-13507 - a monofunctional polyether made from a 50/50 blend of ethylene oxide and propylene oxide. It was obtained from Dow Chemical Company.

Polyglycol AE-501 - a monofunctional polyether made from ethylene oxide. It was obtained from Dow Chemical Company.

11-225 - diethylene glycol adipate, a difunctional polyester with a hydroxyl number of 225. It is sold by Witco, Chemical Corporation.

Modified 11-225 - a polyester prepared from the reaction of Witco 11-225 with one equivalent of acetic anhydride. This is not a pure monofunctional polyester, but rather a blend of difunctional (25%), totally acetylated (25%), and monofunctional (50%) polyester. Of the three blend components, the difunctional component would have no effect on the firmness of a foam product, while the totally acetylated component would actually increase both the firmness and the density. Only the monofunctional component can be expected to reduce the firmness of a foam -- and only after overcoming the effects of the other two components. (See Table 5, columns F and G.)

Monofunctional Polyester - an 800-molecular-weight product which can be prepared in pure form by the steps outlined earlier in this specification. Columns K, L, and M in Table 5 represent postulated data, supplied here to more clearly demonstrate the reduction in firmness accomplished by addition of a pure monofunctional polyester. (Cf. Table 5, columns E, F, and G, presenting actual data for a monofunctional polyester which is not pure.)

Properties

Cream Time is the time interval from the pouring of the first liquid material until that material turns creamy or cloudy.

Rise Time is the time interval from the pouring of the liquid mixture into the mold until the completion of expansion of the foaming mass. Complete expansion is indicated by the cessation of rise, the solidification of the foam, and/or the noticeable evolution of gas bubbles ("health bubbles") on the surface of the foam.

The units of air permeability are cubic feet (of air) per minute (as measured by Test G of ASTM Method D 3574-86).

The units of density are pounds per cubic foot.

The CFD 25% data given are Compression Force Deflection measurements performed in accordance with ASTM D 3574-86 Test C. The units of CFD are pounds per square inch.

TABLE 1

|  | Molecular Weight | OH Number | Effective at (parts per 100 parts of polyol) |
|---|---|---|---|
| EPAL 6 | 102 | 549 | 3,5 |
| EPAL 12/70 | 195 | 288 | 3,5,10 |
| EPAL 1218B | 214 | 262 | 3,5,10 |
| Cetyl alcohol | 242 | 230 | 3,5,10 |
| AE-501 | 550 | 102 | 10,15 |
| XF-13507 | 1700 | 30 | 10,15,25 |

TABLE 2

| Formulation | A (Control) | B |
|---|---|---|
| Voranol 3140 | 100 | 100 |
| TDI 80/20 | 56.5 | 58.2 |
| Index | 102 | 102 |
| H2O | 5.0 | 5.0 |
| Q25160 | 1.4 | 1.4 |
| A-1/33LV 3:1 | 0.07 | 0.07 |
| C-4 | 0.45 | 0.45 |
| Cetyl Alcohol | — | 5.0 |
| Cream Time (sec) | 7 | 7 |
| Rise Time (sec) | 81 | 93 |
| Air Perm | 1.0 | 3.3 |
| Density | 1.31 | 1.31 |
| CFD 25% | 0.47 | 0.27 |

TABLE 3

| Formulation | A (Control) | B | C | D | E | F | G |
|---|---|---|---|---|---|---|---|
| 16-46 | 100 | 100 | 100 | 100 | 100 | 100 | 100 |
| TDI 80/20 | 56.9 | 58.0 | 58.7 | 59.5 | 61.2 | 58.3 | 59.2 |
| Index | 102 | 102 | 102 | 102 | 102 | 102 | 102 |
| H2O | 5.0 | 5.0 | 5.0 | 5.0 | 5.0 | 5.0 | 5.0 |
| Q25160 | 1.4 | 1.4 | 1.4 | 1.4 | 1.4 | 1.4 | 1.4 |
| A-1/33LV 3:1 | 0.15 | 0.15 | 0.15 | 0.15 | 0.15 | 0.15 | 0.15 |
| S-10 | 0.2 | 0.2 | 0.2 | 0.2 | 0.2 | 0.2 | 0.2 |
| Cetyl Alcohol | — | 3.0 | 5.0 | — | — | — | — |
| EPAL 6 | — | — | — | 3.0 | 5.0 | — | — |
| EPAL 12/70 | — | — | — | — | — | 3.0 | 5.0 |
| EPAL 1218B | — | — | — | — | — | — | — |
| DIDP | — | — | — | — | — | — | — |
| Cream Time (sec) | 4 | 4 | 3 | 3 | 4 | 5 | 4 |
| Rise Time (sec) | 95 | 97 | 107 | 86 | 64 | 87 | 85 |
| Air Perm | 3.5 | 4.0 | 4.0 | 3.6 | 4.6 | 4.1 | 4.5 |
| Density | 1.31 | 1.44 | 1.45 | 1.34 | 1.29 | 1.34 | 1.37 |
| CFD 25% | 0.48 | 0.41 | 0.31 | 0.43 | 0.28 | 0.41 | 0.36 |

| Formulation | H | I | J | K | L | M | N |
|---|---|---|---|---|---|---|---|
| 16-46 | 100 | 100 | 100 | 100 | 100 | 100 | 100 |
| TDI 80/20 | 61.5 | 58.2 | 59.0 | 61.1 | 56.9 | 56.9 | 56.9 |
| Index | 102 | 102 | 102 | 102 | 102 | 102 | 102 |
| H2O | 5.0 | 5.0 | 5.0 | 5.0 | 5.0 | 5.0 | 5.0 |
| Q25160 | 1.4 | 1.4 | 1.4 | 1.4 | 1.4 | 1.4 | 1.4 |
| A-1/33LV 3:1 | 0.15 | 0.15 | 0.15 | 0.15 | 0.15 | 0.15 | 0.15 |
| S-10 | 0.2 | 0.2 | 0.2 | 0.2 | 0.2 | 0.2 | 0.2 |
| Cetyl Alcohol | — | — | — | — | — | — | — |
| EPAL 6 | — | — | — | — | — | — | — |
| EPAL 12/70 | 10.0 | — | — | — | — | — | — |
| EPAL 1218B | — | 3.0 | 5.0 | 10.0 | — | — | — |
| DIDP | — | — | — | — | 3.0 | 5.0 | 10.0 |
| Cream Time (sec) | 3 | 5 | 3 | 3 | 3 | 3 | 4 |
| Rise Time (sec) | 84 | 85 | 85 | 79 | 97 | 107 | 119 |
| Air Perm | 4.8 | 4.2 | 4.5 | 4.4 | 4.6 | 4.6 | 3.4 |
| Density | 1.41 | 1.35 | 1.34 | 1.45 | 1.47 | 1.39 | 1.64 |
| CFD 25% | 0.28 | 0.34 | 0.34 | 0.29 | 0.36 | 0.44 | 0.37 |

TABLE 4

| Formulation | A (Control) | B | C | D | E | F |
|---|---|---|---|---|---|---|
| 16-46 | 100 | 90 | 85 | 75 | 90 | 85 |
| TDI 80/20 | 56.60 | 56.48 | 56.34 | 56.08 | 56.96 | 57.06 |
| Index | 102 | 102 | 102 | 102 | 102 | 102 |
| H2O | 5.0 | 5.0 | 5.0 | 5.0 | 5.0 | 5.0 |
| Q25160 | 1.4 | 1.4 | 1.4 | 1.4 | 1.4 | 1.4 |
| A-1/33LV 3:1 | 0.07 | 0.07 | 0.07 | 0.07 | 0.07 | 0.07 |
| T-10 | 0.45 | 0.45 | 0.45 | 0.45 | 0.45 | 0.45 |
| XF-13507 | — | 10 | 15 | 25 | — | — |
| AE-501 | — | — | — | — | 10 | 15 |
| Cream Time (sec) | 6 | 6 | 6 | 6 | 6 | 6 |
| Rise Time (sec) | 110 | 87 | 85 | 94 | 79 | 74 |
| Air Perm | 2.4 | 1.4 | 0.6 | 1.8 | 0.4 | 0.3 |
| Density | 1.46 | 1.34 | 1.31 | 1.45 | 1.37 | 1.35 |
| CFD 25% | 0.51 | 0.47 | 0.42 | 0.33 | 0.49 | 0.30 |

TABLE 5

| Formulation | A | B | C | D | E | F | G |
|---|---|---|---|---|---|---|---|
| F-53 | 100 | 100 | 100 | 100 | 100 | 100 | 100 |
| TDI 80/20 | 44.1 | 44.8 | 45.9 | 47.7 | 44.5 | 45.0 | 45.9 |
| Index | 103 | 103 | 103 | 103 | 103 | 103 | 103 |
| H2O | 3.6 | 3.6 | 3.6 | 3.6 | 3.6 | 3.6 | 3.6 |
| L-532 | 1.3 | 1.3 | 1.3 | 1.3 | 1.3 | 1.3 | 1.3 |
| NEM/A-30 .45:.2 | .95 | .95 | .95 | .95 | .95 | .95 | .95 |
| S-10 | .04 | .04 | .04 | .04 | .04 | .04 | .04 |
| 11-225 | — | 2.0 | 5.0 | 10.0 | — | — | — |
| Modified 11-225 | — | — | — | — | 2.0 | 5.0 | 10.0 |
| Mono. Polyester | — | — | — | — | — | — | — |
| DIDP | — | — | — | — | — | — | — |
| Cream Time (sec) | 3 | 3 | 3 | 4 | 3 | 3 | 3 |
| Rise Time (sec) | 74 | 77 | 83 | 88 | 83 | 83 | 89 |
| Air Perm | <.2 | <.2 | <.2 | <.2 | <.2 | <.2 | <.2 |
| Density | 1.80 | 1.77 | 1.75 | 1.86 | 1.84 | 1.86 | 1.90 |
| CFD 25% | .56 | .55 | .57 | .54 | .58 | .54 | .48 |

| Formulation | H | I | J | K | L | M |
|---|---|---|---|---|---|---|
| F-53 | 100 | 100 | 100 | 100 | 100 | 100 |
| TDI 80/20 | 44.1 | 44.1 | 44.1 | 44.6 | 45.5 | 46.8 |
| Index | 103 | 103 | 103 | 103 | 103 | 103 |
| H2O | 3.6 | 3.6 | 3.6 | 3.6 | 3.6 | 3.6 |
| L-532 | 1.3 | 1.3 | 1.3 | 1.3 | 1.3 | 1.3 |
| NEM/A-30 .45:.2 | .95 | .95 | .95 | .95 | .95 | .95 |
| S-10 | .04 | .04 | .04 | .04 | .04 | .04 |
| 11-225 | — | — | — | — | — | — |
| Modified 11-225 | — | — | — | — | — | — |
| Mono. Polyester | — | — | — | 2.0 | 5.0 | 10.0 |
| DIDP | 2.0 | 5.0 | 10.0 | — | — | — |
| Cream Time (sec) | 2 | 3 | 2 | — | — | — |
| Rise Time (sec) | 86 | 80 | 10 | — | — | — |
| Air Perm | <.2 | <.2 | <.2 | — | — | — |
| Density | 2.13 | 2.11 | — | 1.80 | 1.83 | 1.90 |
| CFD 25% | .61 | .77 | — | .52 | .48 | .42 |

What is claimed:

1. An improved flexible, open-celled polyurethane foam produced in situ from the reaction, in the presence of a catalyst, of an isocyanate, a blowing agent, a foam stabilizer, a polyol selected from the group consisting of polyether polyols, polyester polyols, and mixtures thereof, and a monofunctional additive selected from the group consisting of monofunctional alcohols, monofunctional polyethers, monofunctional polyesters, and mixtures thereof, wherein the monofunctional additive has a hydroxyl number greater than that of the polyol and is present in an amount from about 1 to about 50 parts by weight per 100 parts by weight of polyol, the foam being characterized by reduced firmness as compared with a foam of the same composition which contains substantially no monofunctional additive.

2. The foam of claim 1 wherein the isocyanate is tolylene diisocyanate.

3. The foam of claim 1 wherein the monofunctional alcohol contains at least 3 carbon atoms.

4. The foam of claim 3 wherein the monofunctional alcohol contains from about 8 to about 20 carbon atoms.

5. The foam of claim 4 wherein the monofunctional alcohol is cetyl alcohol.

6. The foam of claim 1 wherein the monofunctional polyester has a molecular weight of from about 300 to about 2000.

7. The foam of claim 6 wherein the monofunctional polyester has a molecular weight of from about 300 to about 800.

8. The foam of claim 1 wherein the monofunctional polyether has a molecular weight of from about 100 to about 3000.

9. The foam of claim 8 wherein the monofunctional polyether has a molecular weight of from about 200 to about 1800.

10. The foam of claim 1 wherein the monofunctional polyether is the addition product of the reaction between an alkylene oxide and a monofunctional alcohol, the alkylene oxide being selected from the group consisting of propylene oxide, ethylene oxide, and mixtures thereof.

11. The foam of claim 10 wherein the monofunctional polyether has a molecular weight of about 1700 and the alkylene oxide is a mixture of 50% ethylene oxide and 50% propylene oxide.

12. The foam of claim 10 wherein the monofunctional polyether has a molecular weight of about 550 and the alkylene oxide is ethylene oxide.

13. The foam of claim 1 wherein the monofunctional polyether or monofunctional polyester is present in an amount from about 5 to about 25 parts by weight per 100 parts by weight of polyol.

14. The foam of claim 1 wherein the monofunctional alcohol is present in an amount from about 2 to about 10 parts by weight per 100 parts by weight of polyol.

15. The foam of claims 13 or 14 which is characterized by reduced firmness and a lower Compression Force Deflection value as compared with a foam of the same composition which contains substantially no monofunctional additive.

16. The foam of claims 13 or 14 wherein the isocyanate is tolylene diisocyanate.

17. The foam of claim 14 wherein the monofunctional alcohol contains at least 3 carbon atoms.

18. The foam of claim 17 wherein the monofunctional alcohol contains from about 8 to about 20 carbon atoms.

19. The foam of claim 18 wherein the monofunctional alcohol is cetyl alcohol.

20. The foam of claim 13 wherein the monofunctional polyester has a molecular weight of from about 300 to about 2000.

21. The foam of claim 20 wherein the monofunctional polyester has a molecular weight of from about 300 to about 800.

22. The foam of claim 13 wherein the monofunctional polyether has a molecular weight of from about 100 to about 3000.

23. The foam of claim 22 wherein the monofunctional polyether has a molecular weight of from about 200 to about 1800.

24. The foam of claim 13 wherein the monofunctional polyether is the addition product of the reaction between an alkylene oxide and a monofunctional alcohol, the alkylene oxide being selected from the group consisting of propylene oxide, ethylene oxide, and mixtures thereof.

25. The foam of claim 24 wherein the monofunctional polyether has a molecular weight of about 1700 and the alkylene oxide is a mixture of 50% ethylene oxide and 50% propylene oxide.

26. The foam of claim 24 wherein the monofunctional polyether has a molecular weight of about 550 and the alkylene oxide is ethylene oxide.

* * * * *